United States Patent
Bouzid et al.

[11] Patent Number: 6,038,076
[45] Date of Patent: Mar. 14, 2000

[54] WAVELENGTH SELECTION, MULTIPLEXING AND DEMULTIPLEXING METHOD AND APPARATUS

[75] Inventors: Ahmed Bouzid, Madison; James F. Aeschbach, Middleton, both of Wis.

[73] Assignee: Noran Instruments, Inc., Middleton, Wis.

[21] Appl. No.: 08/984,600

[22] Filed: Dec. 3, 1997

[51] Int. Cl.[7] ............................................. G02B 27/12
[52] U.S. Cl. ........................ 359/640; 359/634; 359/833
[58] Field of Search ............................ 385/36; 359/634, 359/636, 638, 640, 833, 834

[56] References Cited

U.S. PATENT DOCUMENTS

| | | | |
|---|---|---|---|
| 1,947,668 | 2/1934 | Warmisham | 359/834 |
| 1,994,531 | 3/1935 | Peck | 359/834 |
| 2,227,510 | 1/1941 | Pineo . | |
| 2,406,798 | 9/1946 | Burroughs | 359/834 |
| 2,721,259 | 10/1955 | Krasno . | |
| 3,449,037 | 6/1969 | Koester . | |
| 3,659,927 | 5/1972 | Moultrie | 359/834 |
| 3,710,015 | 1/1973 | Fowler . | |
| 3,743,383 | 7/1973 | Giallorenzi | 359/640 |
| 3,871,750 | 3/1975 | Mecklenborg | 359/834 |
| 3,907,430 | 9/1975 | Mann . | |
| 3,920,983 | 11/1975 | Schlafer et al. . | |
| 3,951,526 | 4/1976 | Grossman . | |
| 4,006,970 | 2/1977 | Slater et al. . | |
| 4,294,546 | 10/1981 | Killmann et al. | 359/834 |
| 4,573,765 | 3/1986 | Ireland | 359/834 |
| 4,580,879 | 4/1986 | Wilson | 359/640 |
| 4,627,690 | 12/1986 | Fantone | 359/834 |
| 4,660,975 | 4/1987 | Aughton . | |
| 4,671,613 | 6/1987 | Buhrer . | |
| 4,708,425 | 11/1987 | Gouali et al. . | |
| 4,870,268 | 9/1989 | Vincent et al. | 359/634 |
| 4,987,567 | 1/1991 | Buhrer . | |
| 5,005,935 | 4/1991 | Kunikane et al. . | |
| 5,548,443 | 8/1996 | Huang | 359/638 |
| 5,699,186 | 12/1997 | Richard | 359/638 |

OTHER PUBLICATIONS

R.L. Fork, et al., "Negative Dispersion Using Pairs of Prisms," Optics Letters, vol. 9, No. 5, May, 1984, p. 150–152.

*Primary Examiner*—Rodney Bovernick
*Assistant Examiner*—Robert W. Wise
*Attorney, Agent, or Firm*—Foley & Lardner

[57] ABSTRACT

Wavelength selection apparatus for use in various applications such as spectrometry, the demultiplexing/multiplexing of multiline laser beams, and so forth, includes an input prism and an output prism aligned along an optical axis, and at least one side mirror. A second side mirror spaced from the first side mirror on the opposite side of the optical axis may be provided, as well as end mirrors adjacent to the input and output prisms. An incoming beam incident upon the input prism is refracted so as to deflect and angularly disperse the various wavelengths present in the input beam, with the dispersing beam reflected from the first side mirror either directly to the output prism or with intermediate reflections from the second side mirror and the end mirrors before impinging upon the output prism. The output prism matches the input prism and deflects and recollimates the dispersed wavelengths to provide parallel output beams of different wavelengths spaced from one another. Selection of a desired wavelength in the output beam may be obtained by moving the input and output prisms with respect to each other axially until the desired output beam is moved to a position in which it passes through an aperture.

35 Claims, 8 Drawing Sheets

WAVELENGTH SELECTION, MULTIPLEXING AND DEMULTIPLEXING METHOD AND APPARATUS

FIELD OF THE INVENTION

This invention pertains generally to the field of optical filters and wavelength multiplexers and demultiplexers, and particularly to systems used for the separation of laser lines.

BACKGROUND OF THE INVENTION

Various applications require the separation of a light beam, such as laser light, into its constituent wavelength components. For example, many types of lasers provide an output beam having a spectral content concentrated at several discrete wavelengths, referred to as lines. Prism spectrometers may be utilized to separate the laser lines, allowing selected lines to be passed or blocked for various purposes such as laser excitation of samples at a specific wavelength. The laser beam can also be filtered by blocking one or more of the separated laser lines and then recombining the remaining lines into an output beam. In certain optical communication systems it is desirable to be able to separate the several wavelengths in an input beam (demultiplex the beam) to form physically separated beams of different wavelengths, which can then be separately modulated. The modulated beams may be recombined (multiplexed) into an output beam which is transmitted by, for example, a waveguide such as an optical fiber.

Various types of prisms have been used in spectrometers to separate the spectral components of an incoming light beam such as a laser beam. When a multiline laser beam is incident upon a single triangular prism, the individual laser lines exiting from the prism will be both physically separated and angularly dispersed. A second prism can be used to intercept the spreading laser lines and redirect the lines in output beams that are substantially parallel to one another and to the original beam. These physically separated but parallel output beams can then be selectively blocked or passed, or separately modulated, depending on the preferred application. However, the use of two (or more) prisms in this manner results in the output beams all being displaced from the input beam. In addition, to obtain sufficient physical separation of the laser lines that exit after passing through the two prisms, it may be necessary to orient the prisms so that the beams strike the prisms at angles substantially different than the Brewster's angle for the wavelength components of the beam, resulting in excessive loss of beam intensity.

SUMMARY OF THE INVENTION

The apparatus of the present invention may be utilized for various applications such as spectrometry, laser cavities, pulse compressors, demultiplexing-multiplexing for optical wavelength filtering, bandpass and bandblock optical filtering, optical communication systems, color processing and imaging, and in selector switches for coupling one or more of the wavelengths in an input beam to an output waveguide such as an optical fiber.

The apparatus in accordance with the invention includes an input refractive prism, an output refractive prism, and at least one side mirror which together form an optical cavity. An incoming beam incident upon the input prism along an optical axis is refracted by the prism to deflect and angularly disperse the various wavelengths present in the input beam. The angularly dispersing beam is reflected at least once from the side mirror or mirrors before being incident upon the output refractive prism, which is formed to match the input prism. The output prism recollimates the dispersed beams at different wavelengths and redirects the multiple wavelength beams so that they are parallel to one another and substantially collinear with the input beam. Preferably, the input and output prisms are triangular prisms identical to one another in index of refraction and prism angles, and are arranged symmetrically so that the angle of exit of the multiple beams from the output prism matches the angle of incidence on the input prism and similarly, the angle of incidence on the output prism matches the angle of exit from the input prism.

By utilizing multiple side mirrors mounted on either side of the optical axis, in accordance with the invention the spectrally separated beams from the input prism may execute multiple reflections at the surfaces of the mirrors before being incident upon the output prism, thereby increasing the spacing between the various output beams with a corresponding enhancement of the spectral sensitivity of the apparatus. The use of one or more side mirrors in the cavity to redirect the dispersing beam allows high sensitivity to be achieved with a compact structure that requires two relatively small, and thus less expensive, refracting prisms rather than the multiple prisms required by spectroscopes of comparable sensitivity. The decomposition of the input beam into multiple output beams retains the characteristics of the input beam in each of the output beams without introducing astigmatism. Furthermore, the input and output prisms are oriented to operate at or near Brewster's angles, so that insertion loss is minimal.

The apparatus can be utilized as a demultiplexer to separate a spectrally mixed input beam, such as the light from a multiline laser, into spatially separated spectral components, and, conversely, as a multiplexer, accepting multiple physically separated parallel input beams at different wavelengths and recombining the beams into a single output beam that is substantially collinear with the input beams.

The apparatus may include means for changing the length of the path of the beams between the input and output prisms while maintaining the orientation of the prisms and the side mirror(s) fixed, thereby changing the position of the components of the output beam. The beam path length and the relative position of the components of the output beam can be changed, for example, by changing the relative axial spacing between the input and output prisms or by changing the spacing of the side mirror from the optical axis, or both. For example, the output prism may be mounted to be selectively moved axially toward or away from the input prism, allowing it to be adjusted in position so that a desired spectral component beam exiting from the output prism is incident upon an aperture, such as the input of an optical fiber waveguide. Further, the optical cavity may be formed with nested side mirrors spaced at different positions off the optical axis of the input beam and with end mirrors mounted adjacent to the input and output prisms and perpendicular to the side mirrors. In a first position of the output prism and the output end mirror, the spectrally separated diverging beams from the input prism may be deflected to reflect off of a first of the nested side mirrors in the cavity and, in a second position of the output prism and output end mirror, to reflect off an outwardly spaced side mirror of the cavity, thereby allowing the apparatus to operate over an even wider range of wavelengths.

Further objects, features and advantages of the invention will be apparent from the following detailed description when taken in conjunction with the accompanying drawings.

DETAILED DESCRIPTION OF THE INVENTION

Figure 1:
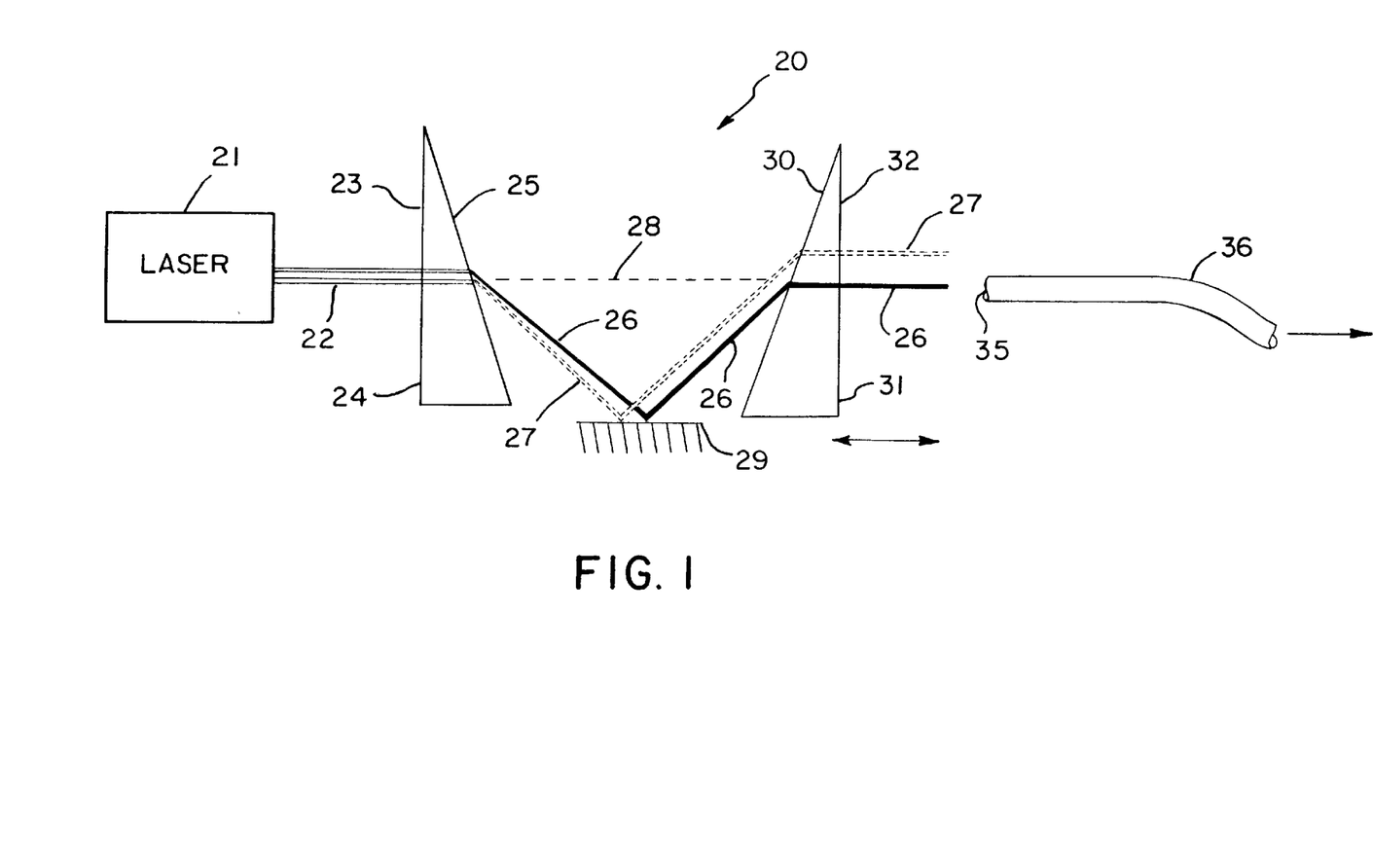
FIG. 1 is a schematic view of a wavelength selection apparatus in accordance with the invention.

With reference to the drawings, wavelength selection apparatus in accordance with the invention is shown schematically at 20 in FIG. 1 to illustrate the principles of the invention. The apparatus 20 receives light from a source 21, e.g., a multiline laser, which provides an output beam 22 that is incident upon an entrance face 23 of an input refractive prism 24. The prism 24 is made of a transparent material of a selected refractive index (e.g., optical glass) that deflects the beam passed through it so that it is deflected angularly away from the axis 28 of the input beam 22 (referred to hereafter as the "axial" direction). The prism spectrally separates the wavelengths of light in the input beam 22 into an angularly dispersing beam of separated wavelengths, which are shown, for purposes of illustration in FIG. 1 as two separated beams 26 and 27. The beams 26 and 27 can comprise, for example, two discrete wavelengths corresponding to the lines of the laser 21. Where the source 21 provides an output beam that contains several wavelengths, or that contains a continuous or substantially continuous distribution of wavelengths, the beams exiting from the input prism 24 will constitute a more complex mix of wavelengths which are spectrally separated either as discrete distinct beams (where the input beam has discrete wavelengths) or a continuously spread angularly dispersing output beam. The dispersing beams extend at an angle away from the optical axis 28 of the system, which axis coincides with the input beam 22.

The basic principles of operation of the apparatus can be best illustrated with respect to the simple case of two discrete wavelengths 26 and 27. The beams 26 and 27 are intercepted by a side mirror 29, e.g., a polished metal surface or polished and coated metal or glass surface, which is parallel to and spaced from the optical axis, and the dispersing beam is specularly reflected by the mirror 29 onto an entrance face 30 of an output prism 31. The output prism 31 preferably matches the input prism 24, i.e., is formed of the same refractive index material (e.g., optical glass) and has the same or substantially the same geometric configuration as the input prism 24 (i.e., has a triangular prism cross-section with congruent angles). Right triangle prisms 24 and 31 are illustrated in FIG. 1. The beams 26 and 27 that are reflected off of the side mirror 29 preferably intersect the entrance face 30 at substantially the same angle as that at which the beams 26 and 27 exited from the exit face 25 of the input prism 24. Consequently, the beams 26 and 27 will be refracted by the prism 31 so that they will exit from the output face 32 of the prism 31 in an axial direction, i.e., a direction parallel to the input beam 22 and the optical axis 28 and substantially collinear with it. Selection of one of the separated output beams 26 and 27 exiting from the face 32 of the prism 31 can be accomplished by selectively blocking and passing the physically separated beams 26 and 27 (or one or more of the multiple beams typical of multiple line lasers). For example, the beam 26 may be directed to an input face 35 of a optical fiber 36 such that the input face 35 receives only the beam 26 and none of the beam 27. Additional optical fibers (not shown) can be positioned to intercept the beam 27 (or other beams that may be present in the output at other wavelengths) to direct these beams to other positions for various purposes. The input face 35 of the fiber 36 effectively acts as an aperture to receive all of and only the spectrally separated output beam 26 which contains optical energy at a discrete wavelength.

In the present invention, the relative position of the output beams 26 and 27 with respect to the optical axis 28 of the system can be changed by displacing the input prism 24 and the output prism 31 axially with respect to each other, or by displacing the side mirror 29 (or side mirrors, as discussed below) with respect to the optical axis, or both. Preferably the input prism 24 is fixed and the output prism 31 is mounted to be selectively moved in an axial direction while maintaining the same orientation of the entrance face 30 and exit face 32 with respect to the optical axis 28. By translating the output prism 31 axially toward the input prism 24, the relative positions of both of the output beams 26 and 27 can be displaced downwardly with respect to the optical axis 28 until, for example, the output beam 27 is incident upon the input face 35 of the optical fiber 36. Consequently, the apparatus 20 can be utilized to selectively switch the output beam 26 or 27 to be coupled into the fiber 36. As an example, the fiber 36 may be directed to various analytical instruments for purposes such as illumination, spectroscopy, light activation, etc. The side mirror 29 may also be mounted on a sliding carriage, scissors-type extension mechanism, or other structure for selectively displacing the side mirror toward or away from the optical axis to thereby change the relative position of the output beams.

By appropriate selection of the position of the side mirror 29 with respect to the optical axis 28 and the spacing between the input prism 24 and the output prism 31, the amount of physical separation between the output beams 26 and 27 passing from the exit face 32 of the prism 31 can be selected. The prisms are preferably matched to each other and are so mounted relative to one another as to maintain symmetry for the beams, i.e., an equal angle of incidence on the input prism and angle of exit from the output prism and an equal angle of exit from the input prism and angle of incidence on the output prism. At the same time, the apparatus allows the angles of incidence of the input beam 22 onto the entrance face 23 of the prism 24 and of the dispersing beams 26 and 27 onto the entrance face of the prism 31 to be maintained at or near the Brewster's angle for these elements, thus minimizing losses in beam intensity at the refractive prisms 24 and 31. In addition, the folded optical cavity defined by the side mirror 29 and the prisms 24 and 31 provides a physically compact optical unit because both of the prisms 24 and 31 are at the same relative position with respect to the optical axis 28, and the output beams 26 and 27 are not only parallel to the optical axis 28 but are substantially collinear with the optical axis and the input beam 22, being displaced only slightly therefrom.

Figure 2:
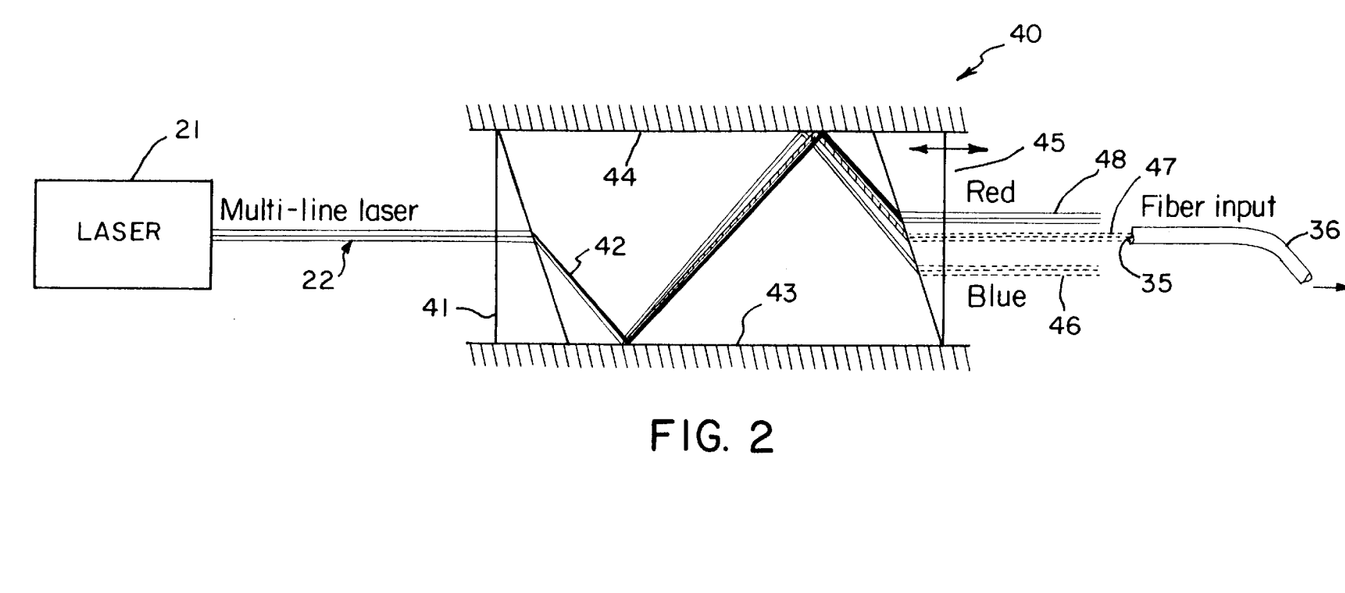
FIG. 2 is a schematic view of wavelength selection apparatus of the invention with an optical cavity arranged for two reflections.

A second configuration of the apparatus of the invention is shown generally at 40 in FIG. 2. In this case, the input prism 41 deflects and disperses the input beam 22 into a multi-wavelength dispersing beam 42 which is reflected off a first side mirror 43. The angularly dispersing beam 42, after reflection from the mirror 43, is then specularly reflected by a second side mirror 44 on the opposite side of the optical axis before being incident upon an output prism 45. The prism 45 matches the input prism 41 and collimates the wavelengths in the dispersing beam 42 into a series of parallel output beams, e.g., the three beams 46, 47 and 48 illustrated in FIG. 2 (for the case where the output beam 22 from the laser 21 is composed of three discrete lines). The optical cavity for the apparatus 40 is defined by the refractive prisms 41 and 45 and the two side mirrors 43 and 44, each of which mirrors is spaced from and aligned parallel to the optical axis of the apparatus, i.e., an axis collinear with the input beam 22. Because the dispersing beam 42 within the optical cavity executes an even number of reflections from the side mirrors 43 and 44, the output prism 45 is oriented in an inverse position with respect to the input prism 41 so that the wavelengths in the dispersing beam 42 will impinge upon the entrance face of the output prism 45 at angles substantially the same as the angles at which the dispersing beam 42 passed from the exit face of the input prism 41.

The selection of one of the output lines 46, 47 or 48 can be accomplished by selecting a particular one of the lines to be incident upon an aperture, e.g., the input face 35 of an optical fiber 36. The output prism 45 may be translated axially toward or away from the input prism 41 to relatively displace the output beams 46–48 from the optical axis and to align the desired output beam 46, 47 or 48 with the input face 35 of the optical fiber 36.

It is seen that because of the multiple reflections of the dispersing beam 42 within the optical cavity, the prisms 41 and 45 may be located at substantially the same position with respect to the optical axis, although inverted with respect to each other, and thus much more closely positioned with respect to each other than would be necessary if the dispersing beam 42 were directly incident upon the output prism 45 without executing intermediate reflections; that is, the output prism 45 would have to be displaced from the optical axis a distance substantially equal to the displacements from the optical axis that are executed by the dispersing beam 42 as it traverses the optical cavity and makes reflections off of the mirrors 43 and 44. Thus, the apparatus of the invention requires much less space than would an apparatus of comparable sensitivity (physical separation of the output beams) that is formed of input and output prisms only.

Figure 3:
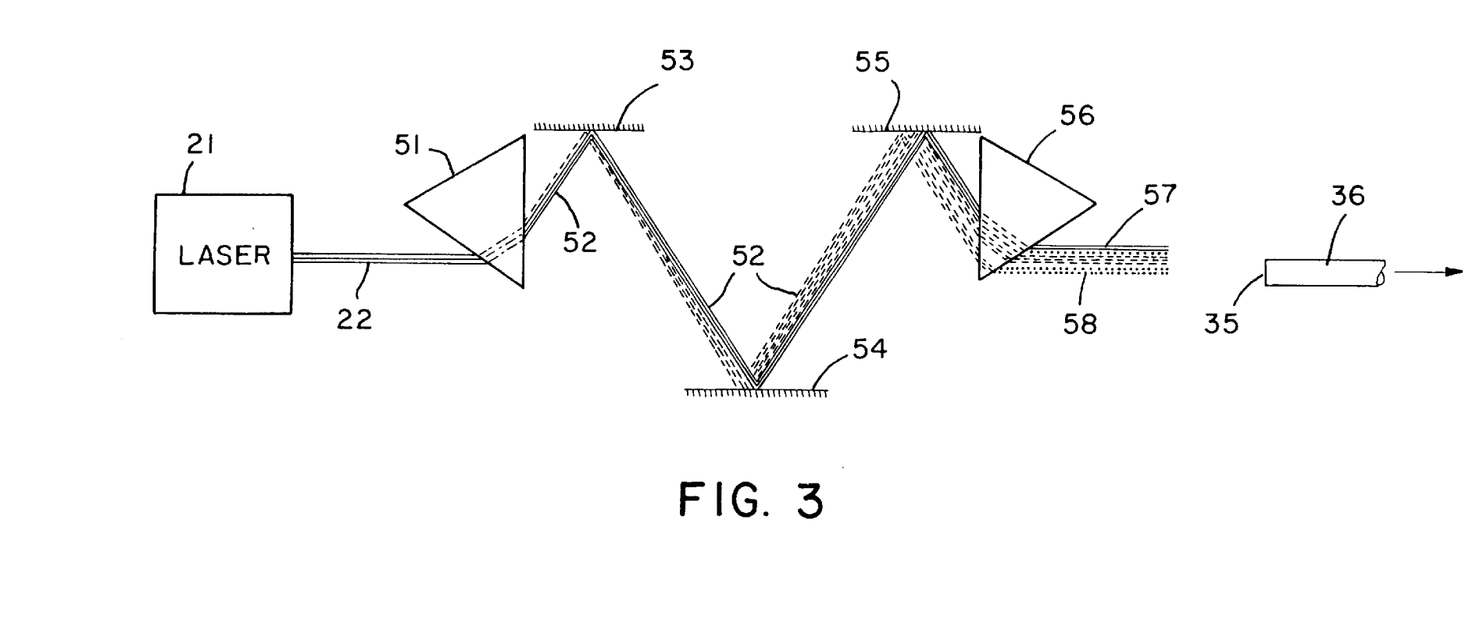
FIG. 3 is a schematic view of wavelength selection apparatus of the invention with an optical cavity arranged for three reflections.

As illustrated schematically at 50 in FIG. 3, the apparatus of the invention may be configured to carry out three reflections from side mirrors within the optical cavity, allowing further separation of the wavelengths within the dispersing beam without increasing the spacing of the output prism from the optical axis. The apparatus 50 includes an input prism 51 which receives the beam 22 from the source 21 and refracts the input beam into a deflected dispersing beam 52 which is reflected from a first side mirror 53 on one side of the optical axis to a second side mirror 54 on the opposite side of the optical axis, whereupon it is reflected back to a side mirror 55 on the opposite side of the optical axis, and thence is reflected to impinge upon an output prism 56 to provide parallel output beams 57 and 58, etc., which may be selectively incident upon the face 35 of an optical fiber 36. Of course, the two side mirrors 53 and 55 may be portions of a single unitary side mirror, although, as illustrated in FIG. 3, mirror surfaces 53–55 need be provided only over the area which will be impinged upon by the dispersing beam 52 within the optical cavity between the prisms 51 and 56.

Figure 4:
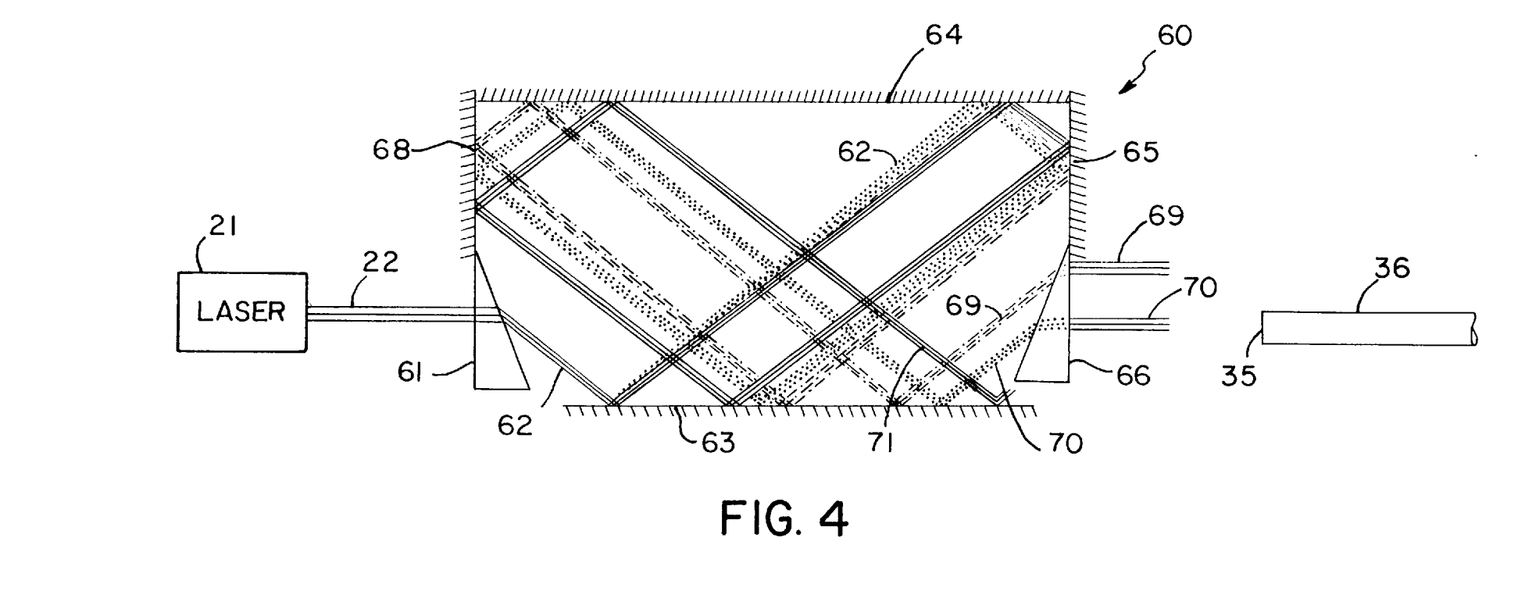
FIG. 4 is a schematic view of wavelength selection apparatus of the invention with an optical cavity arranged for five reflections.

FIG. 4 schematically illustrates at 60 an apparatus in accordance with the invention in which an even larger number of reflections are executed within the optical cavity by utilization of end mirrors as well as side mirrors. In the apparatus 60, an input prism 61 receives the input beam 22 and refracts it to provide a dispersing beam 62. The dispersing beam 62 makes an initial reflection off of a first side mirror 63, and then reflects off a second side mirror 64 on the opposite side of the optical axis. The dispersing beam 62 which is reflected from the mirror 64 then impinges upon an output end mirror 65 mounted above and adjacent to an output prism 66. The end mirror 65 has a reflective surface that is perpendicular to the side mirrors 63 and 64 and thus to the optical axis. The dispersing beam 62 that is reflected from the output end mirror 65 is reflected back to the first side mirror 63 and from there is reflected to an input end mirror 68 which is mounted adjacent to and above the input prism 61. The input end mirror is also perpendicular to the side mirrors. The dispersing beam 62 that is reflected from the end mirror 68 then reflects again from the second side mirror 64 back to the first side mirror 63. At this point, the discrete wavelengths in the input beam 22 have become widely angularly dispersed, as illustrated by the three separated laser lines shown for exemplary purposes at 69, 70 and 71 in FIG. 4. The spectral components 69 and 70 are reflected from positions on the mirror 63 that directs them to impinge upon the entrance face of the output prism 66, which refracts and collimates the beams 69 and 70, so that these beams may be selectively directed or blocked one at a time as desired, e.g., by impinging the selected beam upon the input face 35 of an optical fiber 36. The beam composed of the last line 71 is shown in FIG. 4 as being blocked by the bottom of the prism 66.

Figure 5:
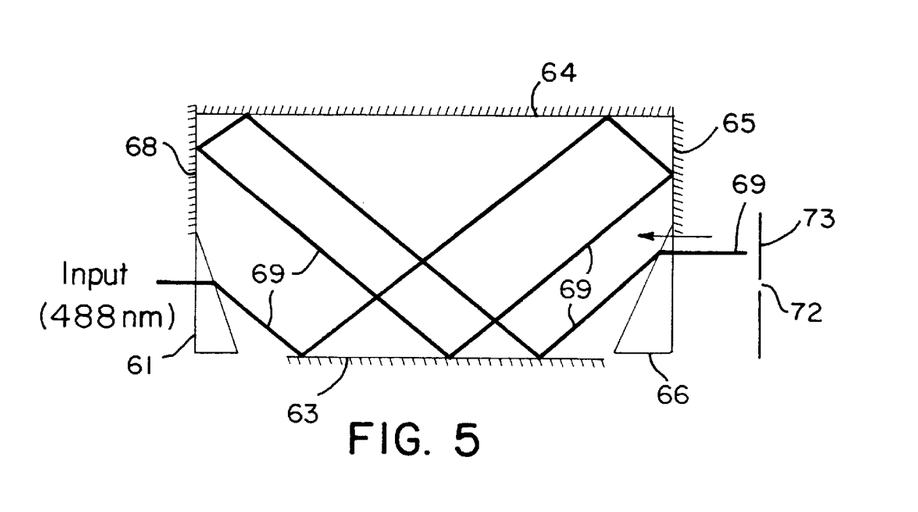
FIGS. 5–7 are schematic views of the wavelength selection apparatus of FIG. 4 illustrating the effect of various relative displacements of the output prism and adjacent output end mirror with respect to the input prism and adjacent input end mirror.
Figure 6:
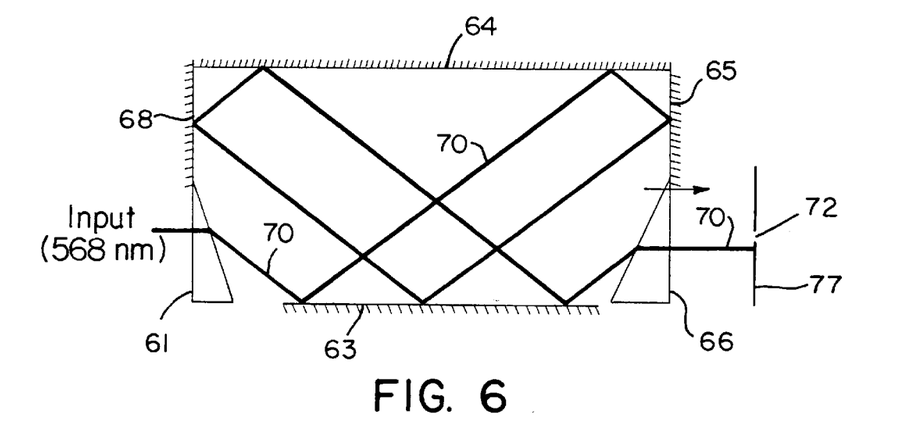
Figure 7:
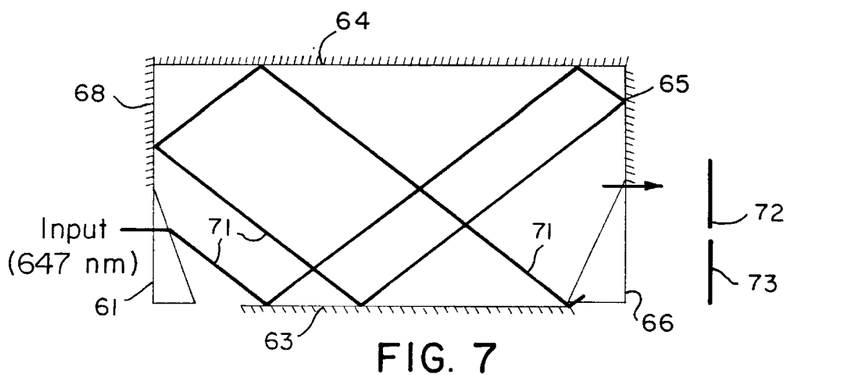

FIGS. 5–7 illustrate the manner in which the output prism 66 and the output end mirror 65 may be moved together (translated) axially either toward or away from the input prism 61 to allow the desired laser line to be selected to pass through an aperture such as the input face 35 of the fiber 36 or, more generally, an output aperture 72 defined in a panel 73. The views of FIGS. 5–7 illustrate the relative deflections of laser lines at three difference wavelengths, for example only, at 488 nm, 568 nm and 647 nm. As illustrated in FIG. 5, the 488 nm (blue) line is most strongly refracted by the prism 61 and, after executing multiple reflections at the mirrors 63, 64, 65 and 68 in the optical cavity, impinges upon the entrance face of the output prism 66 at a position near the top of the prism. To cause the output beam 69 exiting from the prism 66 to align with the aperture 72, the output prism 66 and the output end mirror 65 are moved together axially toward the input prism 61, thereby shifting the output beam 69 vertically downwardly toward the optical axis until it aligns with the aperture 72.

As illustrated in FIG. 6, the 568 nm (yellow) line 70 in the input beam is detracted by the input prism 61 less than the line 69, and exits the output prism 66 at a position just below the aperture 72. To cause the line 70 to align with the aperture 72, the output prism 66 and the output end mirror 65 are moved together axially away from the input prism 61, thereby moving the output beam 70 upwardly toward the optical axis until it aligns with the aperture 72.

As illustrated in FIG. 7, the 647 nm (red) line 71 is defracted least by the input prism 61, and the line 71 makes its final reflection off of the bottom side mirror 63 at a position such that it does not reach the entrance face of the output prism 66 at all (as illustrated in FIG. 7, it is blocked by the bottom face of the output prism 66). Thus, to cause the line 71 to reach the aperture 72, it is necessary to translate the output prism 66 and the output end mirror 65 axially away from the input prism 61 such that the beam 71, after reflection from the first side mirror 63, first impinges upon the entrance face of the output prism 66 and then is moved upwardly, after it exits from the output prism, until the beam 71 exiting from the output prism 66 aligns with the aperture 72.

Figure 8:
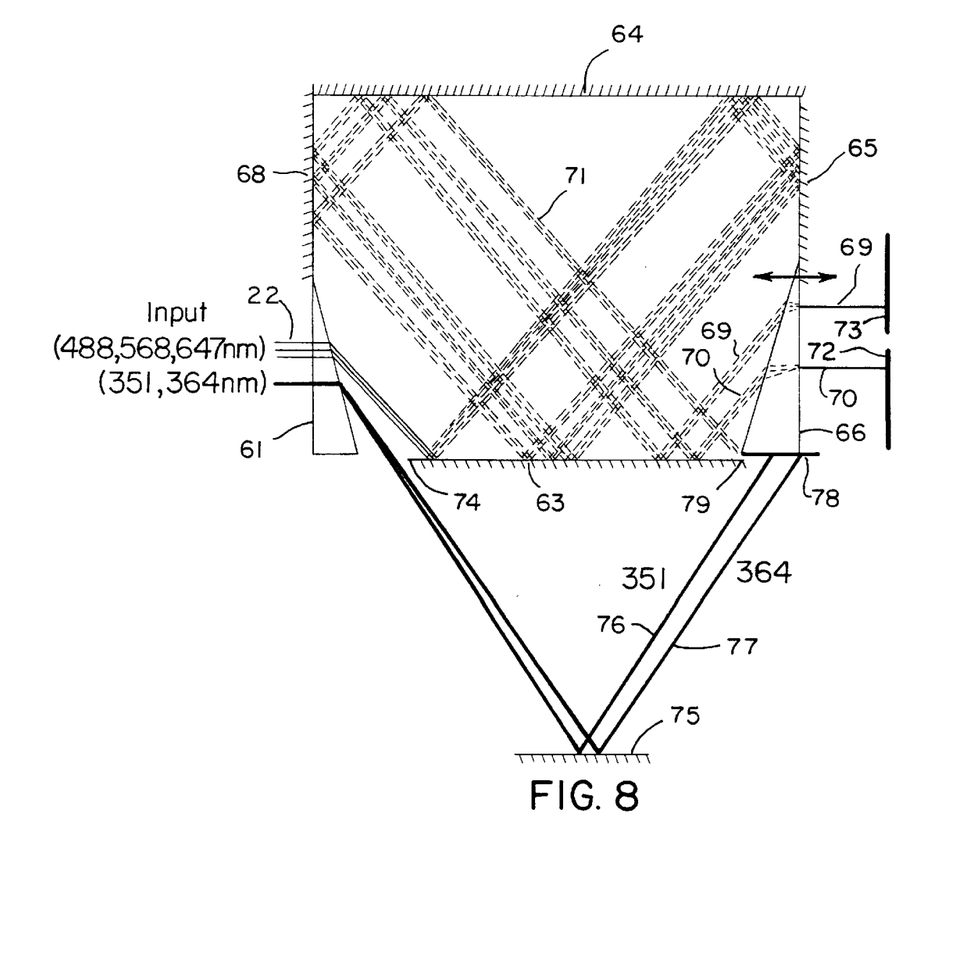
FIG. 8 is a schematic view of a wavelength selection apparatus in accordance with the invention illustrating the deflection of certain wavelengths outside of the main optical cavity to a secondary side mirror.

FIG. 8 illustrates a further embodiment of the apparatus as in FIG. 4 but with the addition of a third side mirror 75 that is parallel to the first side mirror 63 (and the optical axis) and is spaced axially outwardly therefrom. For purposes of illustration, the input beam impinging upon the input prism 61 may consist of laser light composed of visible light at 488 nm, 568 nm and 647 nm laser lines and, in addition, ultraviolet at 351 nm and 364 nm lines. The input lines may also be provided by more than one laser, for example by precombining the beams from the multiple lasers or by impinging the beams from the lasers at different positions on the entrance face of the input prism. The latter two lines are more greatly refracted than the other laser lines by the input prism 61, and the two lines are split into diverging beams 76 (for the 351 nm line) and 77 (for the 364 nm line). One or the other of the lines 76 and 77 may be selected by translation of the output prism 66 and output end mirror 65 in the same manner as described above. However, as illustrated in FIG. 8, the side mirror 63 may terminate at an edge 74 which is adjacent to but spaced away from the input prism 61 sufficiently that the refracted beams 76 and 77 are not intercepted by the side mirror 63 at all, allowing the beams 76 and 77 to pass through the space between the input prisms and the adjacent mirror edge 74 and to impinge upon and be specularly reflected from the outwardly spaced side mirror 75. In the position of the output prism 66 shown in FIG. 8, the diverging beams 76 and 77 would be blocked by the bottom 78 of the output prism 66. However, by moving the output prism 66 outwardly far enough, first the beam 76 and then the beam 77 will pass through a space between the output prism 66 and an adjacent edge 79 of the side mirror 63 and will be incident upon the entrance face of the output prism 66. These beams will thereby be refracted and directed from the output prism 66 in a direction parallel to the input beam 22. By moving the output prism 66 far enough axially away from the input prism, the laser line 76 or the laser line 77 may be caused to align with and pass through the aperture 72, allowing selection of these lines one at a time. An alternative way of permitting some lines to pass through to an outwardly placed cavity is to mount a dichroic mirror in place of the reflective only mirror 63. Such a dichroic mirror can be coated to reflect the wavelength band that is meant to bounce inside the inner cavity, e.g., 488 nm, 568 nm, and 647 nm lines, and to allow the other bands, e.g., 351 nm and 364 nm, to pass through towards the mirror 75. This arrangement can be extended to include more than two nested cavities if desired.

Figure 9:
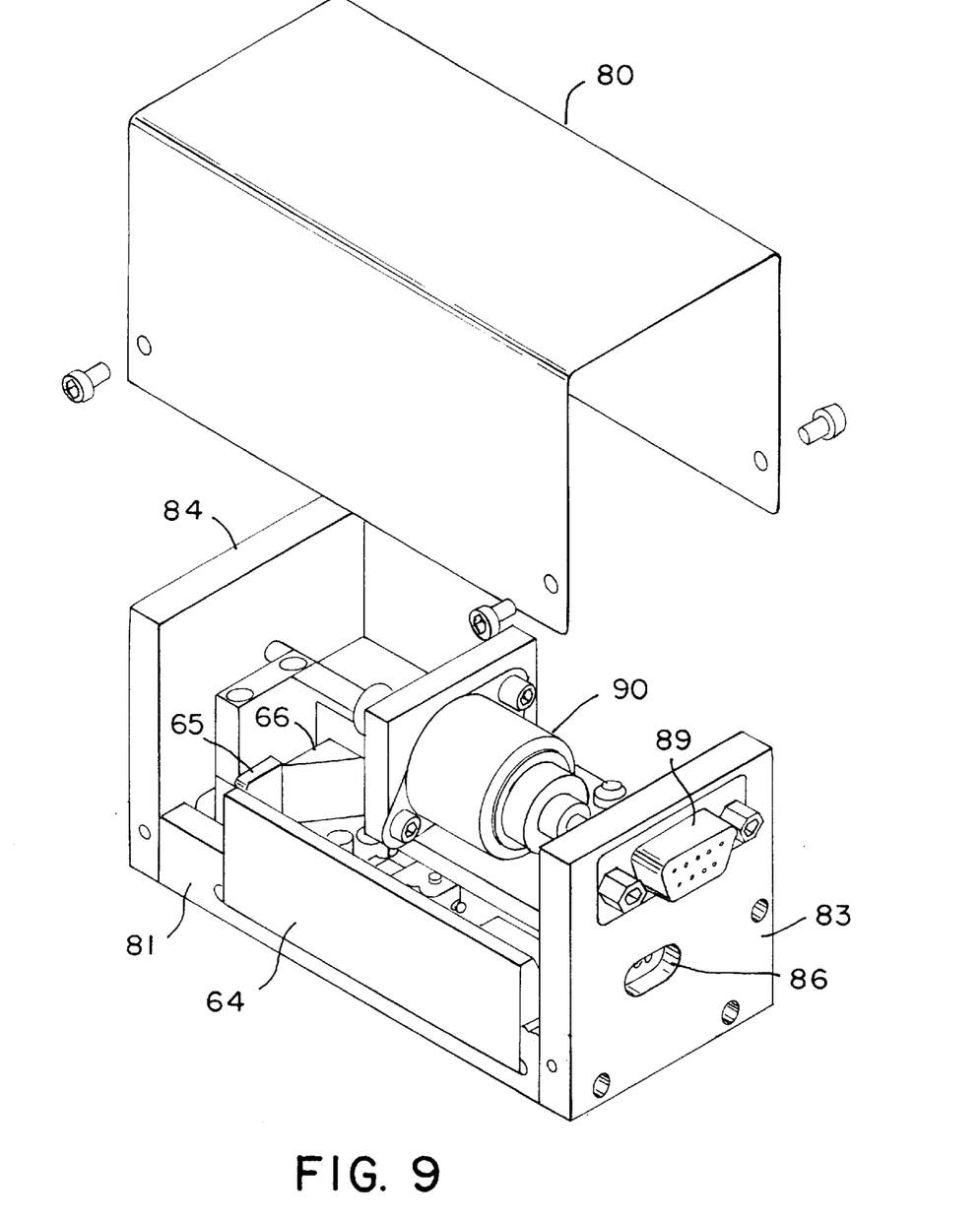
FIG. 9 is a perspective view of a wavelength selection apparatus in accordance with the invention incorporating the optical cavity arrangement illustrated in FIG. 8.
Figure 10:
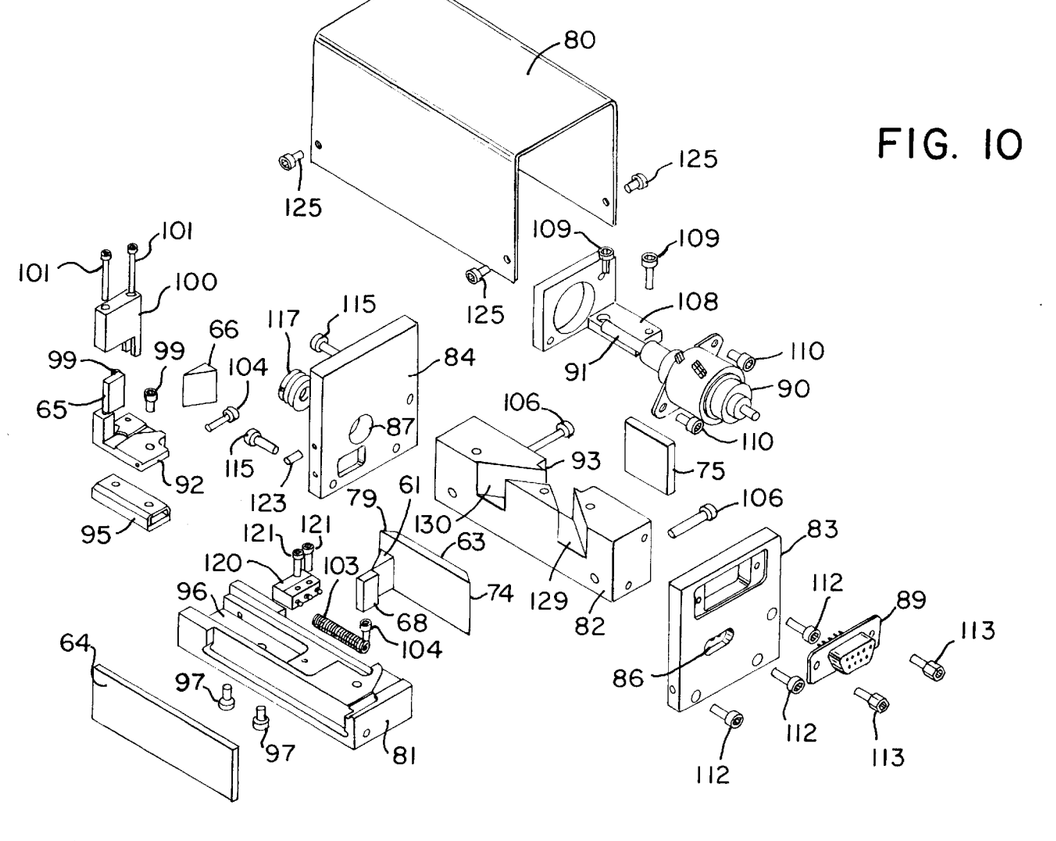
FIG. 10 is an exploded view of the apparatus of FIG. 9 illustrating the parts thereof.

A more detailed view of a wavelength selection and multiplexing or demultiplexing apparatus incorporating the cavity structure illustrated in FIG. 8 is shown in perspective in FIG. 9 and in an exploded view in FIG. 10. FIG. 9 illustrates the apparatus in assembled form with a cover 80 removed to expose the optical components that are mounted on base members 81 and 82 and between an input end mounting plate 83 and an output end mounting plate 84. An entrance opening 86 is provided in the input mounting plate 83 to admit light, e.g., laser light comprised of multiple discrete lines, and an output port 87 (shown in FIG. 10) is provided in the output mounting plate 84 through which the selected wavelength beam (e.g., laser line) exits the apparatus. An electrical connector 89 in the front mounting plate 83 allows connection of electrical power and control signals to the apparatus to allow automatic adjustment of the position of the optical components to carry out the selection of the laser lines. The movement of the components is driven by an electrical stepper motor 90, supplied with power through the connector 89, that selectively advances or retracts a plunger 91.

The assembly of the apparatus is illustrated with respect to the exploded view of FIG. 10. During assembly, the input prism 61 (e.g., formed of Schott SF2 optical glass with anti-reflective coating on the entrance face), side mirrors 63 and 64 and end mirror 68 (e.g., Pyrex glass with metallized mirror surface), are glued in proper position to the base member 81 using a hypo optical adhesive, and the prism 66 and the end mirror 65 (similarly formed to the prism 61 and end mirror 68) are glued with a hypo optical adhesive to a prism carrier 92. The bottom surfaces of the prisms 61 and 66 preferably have an opaque coating. The additional outwardly spaced side mirror 75 that is utilized to reflect more highly refracted short wavelength light, e.g., ultraviolet wavelength laser lines, is glued with hypo optical adhesive to the base member 82, fitting within a slot 93 in the base member 82. A moveable stage 95, having a selected range of linear travel (e.g., 15 mm) is mounted into a slot 96 in the base member 81 and is secured therein using screws 97. The prism carrier 92 with the mirror 65 and the prism 66 secured thereto is mounted to the stage 95 utilizing a screw 99, and a push plate 100 is secured by screws 101 to the prism carrier 92. A spring 103 is connected at one end to the base member 82 and at the other end to the prism carrier 92, using screws 104, to spring bias the carrier 92 (and the prism and mirror on it) axially toward the input prism 61. The base member 82 is secured to the base member 81 using screws 106. A motor bracket 108 is secured to the base member 82 with screws 109, and the stepper motor 90 is mounted to the motor bracket 108 with screws 110. The input mounting plate 83 is then secured to the base members 81 and 82 with screws 112, with the electrical connector 89 being secured to the mounting plate 83 with screws 113, and the output mounting plate 84 is secured to the base members 81 and 82 with screws 115. An output aperture member 117 is secured within the output opening 87, and the connector 89 is connected by electrical wiring (not shown) to the motor 90 and to a limit switch 120, itself secured by screws 121 to the base member 81. The limit switch 120 is mounted in position to be engaged by the prism carrier 92 at an inwardmost limit of travel of the carrier to control shutdown of the stepper motor 90. The switch 170 is connected by wires (not shown) to the connector 89. A set screw 123 can be mounted to the plate 84 to adjust the position of the aperture 117. The cover 80 is then secured to the base members 81 and 82 with screws 125.

In operation, the input beam 22, such as provided by a multiline laser which includes both visible light lines and ultraviolet light lines, is projected through the input opening 86 and is intercepted by the input prism 61. The stepper motor 90 can be controlled to move the prism carrier 92 axially to move the output prism 66 and the output end mirror 65 either toward or away from the input prism 61 to select the laser line that is permitted to pass through the aperture 117. The visible light laser lines will be refracted by the input prism 61 to be incident upon the first side mirror 63. Shorter wavelength laser lines, for example those in the ultraviolet range, will be strongly refracted by the input prism 61 and will be deflected past a beveled edge 74 of the first side mirror 63 and will pass into an input channel 129 machined in the base member 82 to permit such lines to be incident upon the outwardly spaced side mirror 75. The laser lines that are reflected from the side mirror 75 pass through a second channel 130 machined in the base member 82 and past a beveled edge 79 on the output side of the first side mirror 63. When visible laser lines are being selected, the bottom edge of the output prism 66 (which may be painted or otherwise coated or covered with a blocking sheet or other material) blocks the laser lines reflected from the mirror 75 through the channel 130. However, when it is desired to select the ultraviolet laser lines reflected from the mirror 75, the stepper motor 90 is controlled to advance the plunger 91 against the pusher plate 100 to move the prism carrier 92 and the output prism 66 and output end mirror 65 (against the returning force of the spring 103) axially away from the input prism sufficiently to allow the laser lines reflected from the mirror 75 to pass through a space between the output prism 66 and the adjacent edge 79 of the side mirror 63 and to be incident upon the entrance face of the prism 66. By controlling the motor 90 to properly position the prism 66 and end mirror 65, the particular one of the laser lines reflected from the mirror 75 that is desired can be selected to pass through the aperture 117.

The mechanism illustrated in FIGS. 9 and 10 is a preferred means for mounting the prisms and end mirrors for relative movement axially with respect to each other, but any other mechanism for providing such relative movement may be used as desired to provide such a function. In addition, mechanisms for displacing the side mirror(s) with respect to the optical axis may be utilized if desired. By changing the axial spacing between the input and output prisms or the spacing of the side mirror (or mirrors) from the optical axis, or both, while maintaining the orientation of the prisms and side mirror(s) fixed, the length of the path of the light beam in the optical cavity can be changed until a selected beam corresponding to one of the laser lines exiting from the output prism is incident upon the aperture so that the beam can be passed through the aperture.

Multiplexing and demultiplexing of selected wavelengths, and optical filtering, can be accomplished by using two units of the wavelength selection apparatus of the invention in series. The first unit separates the beam into multiple separated beams of different wavelengths, which can be individually blocked or modulated, and the remaining beams may be recombined by the second unit into a single beam.

It is understood that the invention is not confined to the particular construction and arrangement of parts herein illustrated and described, but embraces all such modified forms thereof as come within the scope of the following claims.

What is claimed is:

1. Wavelength selection apparatus comprising:
   (a) a wavelength dispersive input refractive prism;
   (b) a wavelength dispersive output refractive prism matching the input prism and aligned on an optical axis defined between the prisms along which an incoming beam can impinge on the input prism;
   (c) a reflecting side mirror spaced from and parallel to the optical axis in position between the input and output prisms such that a beam of light impinging upon the input prism along the optical axis will be deflected by the input prism to the side mirror and dispersed by wavelength and is at least partially reflected by the side mirror to impinge upon the output prism and be deflected by the output prism into collimated beams of different wavelengths exiting substantially parallel to one another; and
   (d) means for changing the length of the path of the beams between the input and output prisms while maintaining the orientation of the prisms and the side mirror fixed such that the displacement of the beams of different wavelengths of light exiting from the output prism from the optical axis may be changed.

2. The apparatus of claim 1 wherein the input and output prisms are shaped as right triangles and are symmetric with each other.

3. The apparatus of claim 1 further including a multiline laser light source providing a beam of laser light of multiple wavelengths to the input prism along the optical axis.

4. The apparatus of claim 1 wherein the side mirror is a first side mirror and further including a second side mirror mounted across the optical axis from and parallel to the first side mirror, and wherein the first and second side mirrors are positioned with respect to each other such that light exiting from the input prism is deflected to the first side mirror and is reflected therefrom to the second side mirror before impinging upon the output prism.

5. The apparatus of claim 4 wherein the spacing between the input and output prisms is selected such that light exiting from the input prism is deflected to the first side mirror to reflect from the first side mirror to the second side mirror and to reflect from the second side mirror back to the first side mirror and to reflect therefrom to the output prism.

6. The apparatus of claim 4 further including an input end mirror mounted adjacent to the input prism and perpendicular to the side mirrors and an output end mirror mounted adjacent to the output prism and perpendicular to the side mirrors, and wherein the spacing between the input and output prisms and the input and output side mirrors is selected such that light exiting from the input prism is deflected toward the first side mirror and executes multiple reflections around the optical cavity defined by the first and second side mirrors and the input and output end mirrors so as to reflect off of each of these mirrors at least once before impinging upon the output prism.

7. The apparatus of claim 1 wherein the input and output prisms are formed of a transparent material that passes and refracts visible light and ultraviolet light wavelengths.

8. Wavelength selection apparatus comprising:
   (a) a wavelength dispersive input refractive prism;
   (b) a wavelength dispersive output refractive prism matching the input prism and aligned on an optical axis defined between the prisms along which an incoming beam can impinge on the input prism;
   (c) a reflecting side mirror spaced from and parallel to the optical axis in position between the input and output prisms such that a beam of light impinging upon the input prism along the optical axis will be deflected by the input prism to the side mirror and dispersed by wavelength and is at least partially reflected by the side mirror to impinge upon the output prism and be deflected by the output prism into collimated beams of different wavelengths exiting substantially parallel to one another;

(d) means for changing the length of the path of the beams between the input and output prisms while maintaining the orientation of the prisms and the side mirror fixed such that the displacement of the beams of different wavelengths of light exiting from the output prism from the optical axis may be changed;

(e) a multiline laser light source providing a beam of laser light of multiple wavelengths to the input prism along the optical axis; and (f) further including an optical aperture positioned adjacent to the output prism to selectively receive and pass a beam comprised of a single wavelength at one of the lines of the multiline laser.

9. The apparatus of claim 8 wherein the aperture comprises an optical fiber having an input face which serves as an aperture to selectively receive a beam comprised of a single wavelength at one of the lines of the multiline laser.

10. Wavelength selection apparatus comprising:

(a) a wavelength dispersive input refractive prism;

(b) a wavelength dispersive output refractive prism matching the input prism and aligned on an optical axis defined between the prisms along which an incoming beam can impinge on the input prism; and (c) first and second reflecting side mirrors each spaced from and parallel to the optical axis and parallel to each other, the side mirrors positioned between the input and output prisms to define an optical cavity with the prisms, the prisms and side mirrors positioned such that a beam of light impinging on the input prism along the optical axis will be dispersed by wavelength and deflected to reflect at least once from the first side mirror to the second side mirror and to reflect from the second side mirror to the first side mirror before impinging upon the output prism, and is deflected thereby to exit the output prism as collimated beams of different wavelengths exiting substantially parallel to one another.

11. The apparatus of claim 10 further including a multiline laser light source providing a beam of laser light of multiple wavelengths to the input prism along the optical axis.

12. The apparatus of claim 10 wherein the input and output prisms are formed of a transparent material that passes and refracts visible light and ultraviolet light wavelengths.

13. Wavelength selection apparatus comprising:

(a) a wavelength dispersive input refractive prism;

(b) a wavelength dispersive output refractive prism matching the input prism and aligned on an optical axis defined between the prisms along which an incoming beam can impinge on the input prism; and (c) first and second reflecting side mirrors each spaced from and parallel to the optical axis and parallel to each other, the side mirrors positioned between the input and output prisms to define an optical cavity with the prisms, the prisms and side mirrors positioned such that a beam of light impinging on the input prism along the optical axis will be dispersed by wavelength and deflected to reflect at least once from the first side mirror to the second side mirror and to reflect from the second side mirror to the first side mirror before impinging upon the output prism, and is deflected thereby to exit the output prism as collimated beams of different wavelengths exiting substantially parallel to one another, further including means for mounting the input and output prisms for relative axial movement toward and away from each other such that the displacement of the beams of different wavelengths of light exiting from the output prism from the optical axis may be adjusted by adjusting the relative displacement between the input and output prisms.

14. Wavelength selection apparatus comprising:

(a) a wavelength dispersive input refractive prism;

(b) a wavelength dispersive output refractive prism matching the input prism and aligned on an optical axis defined between the prisms along which an incoming beam can impinge on the input prism; and (c) first and second reflecting side mirrors each spaced from and parallel to the optical axis and parallel to each other, the side mirrors positioned between the input and output prisms to define an optical cavity with the prisms, the prisms and side mirrors positioned such that a beam of light impinging on the input prism along the optical axis will be dispersed by wavelength and deflected to reflect at least once from the first side mirror to the second side mirror and to reflect from the second side mirror to the first side mirror before impinging upon the output prism, and is deflected thereby to exit the output prism as collimated beams of different wavelengths exiting substantially parallel to one another, wherein the input and output prisms are shaped as right triangles and are symmetric with each other.

15. Wavelength selection apparatus comprising:

(a) a wavelength dispersive input refractive prism;

(b) a wavelength dispersive output refractive prism matching the input prism and aligned on an optical axis defined between the prisms along which an incoming beam can impinge on the input prism; and (c) first and second reflecting side mirrors each spaced from and parallel to the optical axis and parallel to each other, the side mirrors positioned between the input and output prisms to define an optical cavity with the prisms, the prisms and side mirrors positioned such that a beam of light impinging on the input prism along the optical axis will be dispersed by wavelength and deflected to reflect at least once from the first side mirror to the second side mirror and to reflect from the second side mirror to the first side mirror before impinging upon the output prism, and is deflected thereby to exit the output prism as collimated beams of different wavelengths exiting substantially parallel to one another, further including an optical aperture positioned adjacent to the output prism to selectively receive and pass a beam comprised of a single wavelength at one of the lines of a multiline laser.

16. The apparatus of claim 15 wherein the aperture comprises an optical fiber having an input face which serves as an aperture to selectively receive a beam comprised of a single wavelength at one of the lines of a multiline laser.

17. Wavelength selection apparatus comprising:

(a) a wavelength dispersive input refractive prism;

(b) a wavelength dispersive output refractive prism matching the input prism and aligned on an optical axis defined between the prisms along which an incoming beam can impinge on the input prism; and (c) first and second reflecting side mirrors each spaced from and parallel to the optical axis and parallel to each other, the side mirrors positioned between the input and output prisms to define an optical cavity with the prisms, the prisms and side mirrors positioned such that a beam of light impinging on the input prism along the optical axis will be dispersed by wavelength and deflected to reflect at least once from the first side mirror to the second side mirror and to reflect from the second side mirror to the first side mirror before impinging upon the output prism, and is deflected thereby to exit the output prism as collimated beams of different wavelengths exiting substantially parallel to one another, further including an input end mirror mounted adjacent to the input prism and perpendicular to the side mirrors and an output end mirror mounted adjacent to the output prism and perpendicular to the side mirrors, and wherein the spacing between the input and output prisms and the input and output side mirrors is selected such that light exiting from the input prism is deflected toward the first side mirror and executes multiple reflections around the optical cavity defined by the first and second side mirrors and the input and output end mirrors so as to reflect off of each of these mirrors at least once before impinging upon the output prism.

18. Wavelength selection apparatus comprising:
(a) a wavelength dispersive input refractive prism;
(b) a wavelength dispersive output refractive prism matching the input prism and aligned on an optical axis defined between the prisms along which an incoming beam can impinge on the input prism;
(c) first and second reflecting side mirrors each spaced from and parallel to the optical axis and parallel to each other, the side mirrors positioned between the input and output prisms to define an optical cavity with the prisms; and
(d) an input end mirror mounted adjacent to the input prism at the input side of the optical cavity and an output end mirror mounted adjacent to the output prism at the output side of the cavity, the input and output end mirrors mounted perpendicular to the side mirrors and positioned such that a beam of light impinging on the input prism along the optical axis will be deflected to reflect off of each of the first and second side mirrors and the input and output end mirrors before impinging upon the output prism to be deflected thereby to exit the output prism as collimated beams of different wavelengths exiting substantially parallel to one another.

19. The apparatus of claim 18 further including means for mounting the input and output prisms for relative axial movement toward and away from each other such that the displacement of the beams of different wavelengths of light exiting from the output prism from the optical axis may be adjusted by adjusting the relative displacement between the input and output prisms.

20. The apparatus of claim 18 wherein the input and output prisms are shaped as right triangles and are symmetric with each other.

21. The apparatus of claim 18 further including a multi-line laser light source providing a beam of laser light of multiple wavelengths to the input prism along the optical axis.

22. The apparatus of claim 18 further including an optical aperture positioned adjacent to the output prism to selectively receive and pass a beam comprised of a single wavelength at one of the lines of the multiline laser.

23. The apparatus of claim 22 wherein the aperture comprises an optical fiber having an input face which serves as an aperture to selectively receive a beam comprised of a single wavelength at one of the lines of the multiline laser.

24. The apparatus of claim 18 wherein the input and output prisms are formed of a transparent material that passes and refracts visible light and ultraviolet light wavelengths.

25. Wavelength selection apparatus comprising:
(a) a wavelength dispersive input refractive prism which refracts visible and ultraviolet light;
(b) a wavelength dispersive output refractive prism matching the input prism and aligned on an optical axis defined between the prisms along which an incoming beam can impinge on the input prism;
(c) first and second reflecting side mirrors each spaced from and parallel to the optical axis and parallel to each other, the side mirrors positioned between the input and output prisms to define an optical cavity with the prisms, the prisms and side mirrors positioned such that a beam of light impinging on the input prism along the optical axis will be dispersed by wavelength and deflected to reflect at least once from the first side mirror to the second side mirror and to reflect from the second side mirror to the first side mirror before impinging upon the output prism, and is deflected thereby to exit the output prism as collimated beams of different wavelengths exiting substantially parallel to one another;
(d) an additional side mirror spaced outwardly from the first side mirror with respect to the optical axis and parallel thereto, wherein a space is provided between the input prism and an adjacent edge of the input side mirror, and wherein the input prism is formed to deflect a short wavelength light in the ultraviolet range more greatly than visible light so that the ultraviolet light passes through the space between the input prism and the adjacent edge of the first side mirror while visible light is deflected less and is incident upon the first side mirror, and wherein the additional outwardly spaced side mirror is positioned to intercept the short wavelength ultraviolet light and to reflect it toward the output prism; and
(e) means for mounting the output prism for translation toward and away from the input prism along the optical axis, the output prism moveable from a position in which visible light reflected from the first or second side mirrors is incident upon the output prism to a position spaced further axially away from the input prism such that a space is provided between the output prism and an adjacent edge of the first side mirror that is sufficient to allow the short wavelength light reflected from the additional outwardly positioned side mirror to pass through the space and be incident upon the output prism to be deflected thereby into a collimated output beam.

26. The apparatus of claim 25 wherein the input and output prisms are shaped as right triangles and are symmetric with each other.

27. The apparatus of claim 25 further including a multi-line laser light source providing a beam of laser light of multiple wavelengths to the input prism along the optical axis.

28. The apparatus of claim 27 further including an optical aperture positioned adjacent to the output prism to selectively receive and pass a beam comprised of a single wavelength at one of the lines of the multiline laser.

29. The apparatus of claim 28 wherein the aperture comprises an optical fiber having an input face which serves as an aperture to selectively receive a beam comprised of a single wavelength at one of the lines of the multiline laser.

30. The apparatus of claim 25 further including an input end mirror mounted adjacent to the input prism and perpendicular to the side mirrors and an output end mirror mounted adjacent to the output prism and perpendicular to the side mirrors, and wherein the spacing between the input and output prisms and the input and output side mirrors is selected such that light exiting from the input prism is deflected toward the first side mirror and executes multiple reflections around the optical cavity defined by the first and second side mirrors and the input and output end mirrors so as to reflect off of each of these mirrors at least once before impinging upon the output prism.

31. A method of selecting laser lines from a multiline laser comprising the steps of:

(a) directing a beam of light from a multiline laser to an input prism;

(b) deflecting and dispersing by wavelength with the input prism the incoming beam of light to provide a dispersing beam, reflecting the dispersing beam from a side mirror to impinge onto an output prism, and deflecting the dispersing beam in the output prism to provide multiple parallel beams exiting from the output prism corresponding to the wavelengths of light from the laser beam such that the output beams are spaced from one another and are substantially parallel to one another;

(c) providing an aperture which permits one of the output beams constituting one line of the multiline laser at a time to pass through, which is positioned to receive the output beams from the output prisms; and (d) changing the length of the path of the beams in the optical cavity between the input and output prisms while maintaining the orientation of the prisms and side mirror fixed until a selected beam corresponding to one of the laser lines exiting from the output prism is incident upon the aperture and passing that beam through the aperture.

32. The method of claim 31 wherein the step of providing an aperture comprises providing an optical fiber having an input end face, and positioning the input end face adjacent to the output prism to serve as an aperture to receive a beam exiting from the output prism.

33. The method of claim 31 further including the step of reflecting the dispersing beam at least once off of a second side mirror before the dispersing beam impinges on the output prism.

34. The method of claim 33 further including the steps of reflecting the dispersing beam off of an input end mirror adjacent to the input prism and an output end mirror adjacent to the output prism before the dispersing beam impinges on the output prism.

35. The method of claim 31 wherein the step of changing the length of the path of the beams is carried out by translating the output prism along an axis parallel to the beam of light that is directed to the input prism.

* * * * *